No. 641,530. Patented Jan. 16, 1900.
H. G. MOSHER.
HARROW AND PULVERIZER.
(Application filed Aug. 17, 1899.)
(No Model.)
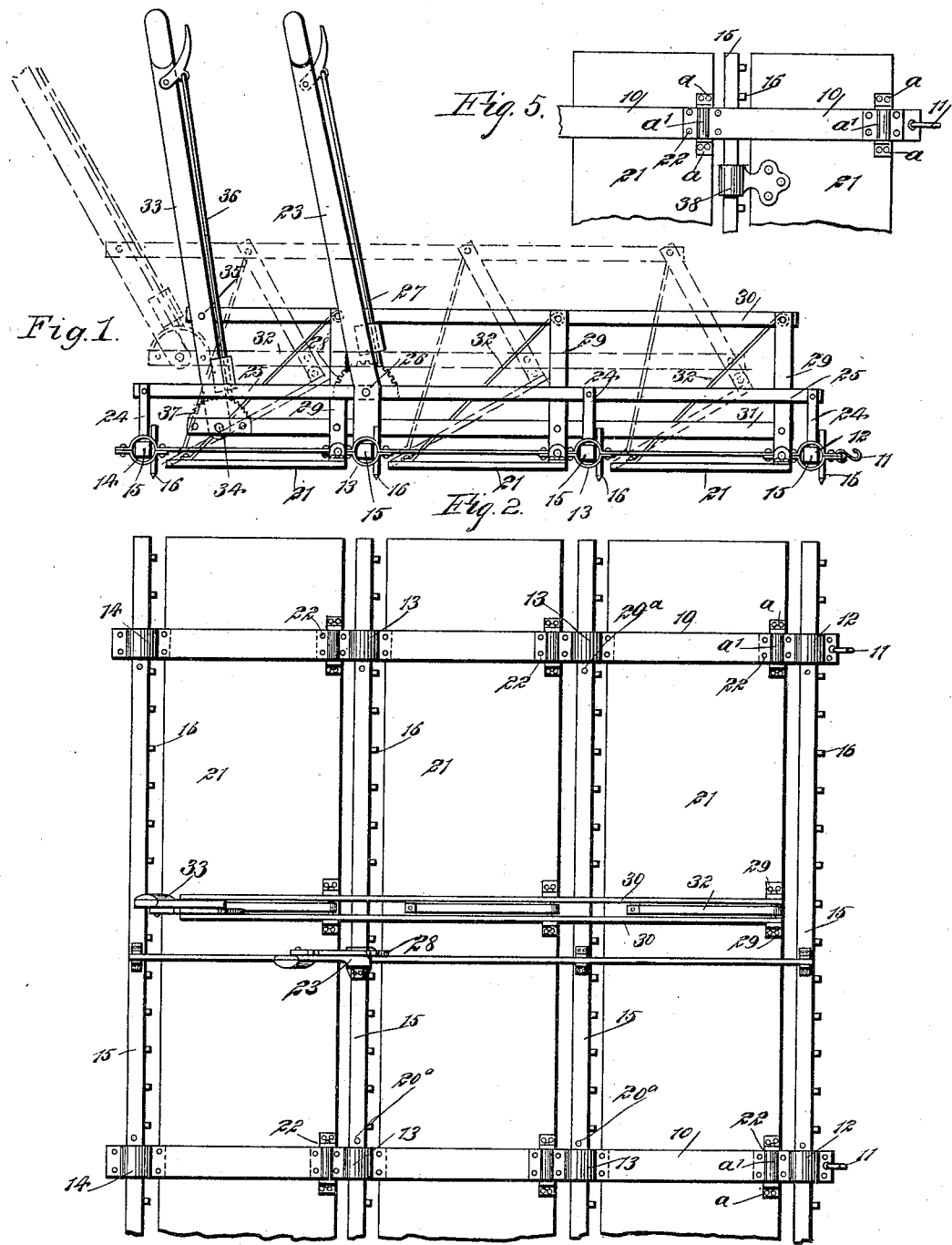
WITNESSES:
INVENTOR
H. G. Mosher
BY
ATTORNEYS

UNITED STATES PATENT OFFICE.

HENRY G. MOSHER, OF FAIRMOUNT, NEBRASKA.

HARROW AND PULVERIZER.

SPECIFICATION forming part of Letters Patent No. 641,530, dated January 16, 1900.

Application filed August 17, 1899. Serial No. 727,550. (No model.)

*To all whom it may concern:*

Be it known that I, HENRY G. MOSHER, of Fairmount, in the county of Fillmore and State of Nebraska, have invented a new and Improved Harrow and Pulverizer, of which the following is a full, clear, and exact description.

The object of the invention is to construct a harrow and pulverizer with crushing-plates and toothed bars so arranged that both may be adjusted at the same time or whereby the plates may be adjusted independently of the toothed bars.

A further object of the invention is to so group the plates and toothed bars that the plates when placed parallel with the ground will insure the teeth entering the soil the desired depth, thus enabling a field to be harrowed even when young plants are about appearing at the surface of the soil.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the improved machine. Fig. 2 is a plan view thereof, an end portion being broken away. Fig. 3 is a detail view of a portion of one of the toothed bars, a part of the bar being broken away and a tooth appearing in section. Fig. 4 is a transverse section through one of the toothed bars, illustrating a tooth in side elevation; and Fig. 5 is a plan view of a portion of the machine, illustrating a modification in the bearings for the toothed bars.

Two or more straps 10 of suitable thickness are placed parallel to each other a given distance apart, and said strips extend in direction of the front and rear of the machine. Each strap at its forward end is provided with a clevis 11 or other form of draft device and at the rear of said clevis with a socket 12, together with sockets 13, intermediate of their ends, and rear end sockets 14. Bars 15 are held to turn in transversely-alining sockets of the said straps 10. These bars may be polygonal in cross-section or may be given any desired cross-sectional shape. In Fig. 1 they are shown as rectangular, and in Figs. 3 and 4 the bars are shown as L-shaped, and teeth 16 are secured, preferably, to the outer front faces of the said bars 15 in any suitable or approved manner. Usually, however, U-shaped straps 17 are employed to hold the teeth in position, and normally one leg of a strap is carried in direction of the opposite leg, as shown in dotted lines in Fig. 3, and the leg thus placed at an angle to the other leg is provided with a head 18, forming a hook, while the other leg is provided with a threaded extremity adapted to receive a nut 19.

In operation the leg having the hook end 18 is introduced into an elongated opening 20 made in the bar, while the threaded end is passed through a round opening. The nut 19 is then screwed upon the threaded leg only far enough to hold the strap in place. The pointed end of a tooth 16 is then inserted into the strap 17 and is driven down the desired distance, thus spreading apart the legs and locking the hook-leg in position upon the bar, and finally the nut 19 is screwed upon the threaded leg until the tooth 16 is firmly held in place. The bars are prevented from shifting by pins 20$^a$, that are passed through said bars adjacent to the sockets in which the bars turn, or any equivalent of the pins 20$^a$ may be employed. Plates 21, adapted to smooth or pulverize the ground, are located between the toothed bars 15, and these plates have a hinged connection 22 with the straps 10, the hinge being shown at the forward edges of the plates, although, if desired, the position of the hinges may be changed.

Ordinarily each plate 21 is provided with lugs $a$, that extend upward at the opposite sides of the straps, and the straps are provided with knuckles $a'$, adapted to enter between the lugs. The hinge connection is completed by passing pintles through the lugs $a$ and knuckles $a'$.

The toothed bars are rocked in their sockets to bring the teeth at any desired angle to the ground through the medium of a hand-lever 23. This lever is preferably of angular construction, as shown in Fig. 1, and is secured to one of the intermediate toothed bars, as illustrated in both Figs. 1 and 2, while each of the other toothed bars is provided with an upright 24, and these uprights are pivotally connected by a longitudinal bar 25, to which bar the hand-lever 23 is fulcrumed at the junction of its members. The hand-lever 23 is provided with a thumb-latch 27, adapted to engage with a rack 28, secured upon the longitudinal bar 24. Thus it will be observed that by shifting the hand-lever 23 all the toothed bars may be simultaneously rocked and the teeth given the same angle to the ground.

The plates 21 are moved independently of the toothed bars, as stated, and this is accomplished by providing uprights 29 for each plate near its hinged edge, and these uprights are pivotally connected at the top by cross-bars 30 and near the bottom by cross-bars 31. Braces 32 are secured at one of their ends to the plates near their free edges, the upper ends of the braces being pivoted between the uprights 29.

A hand-lever 33 is provided to change the angle of the plates relative to the ground, as shown in dotted lines in Fig. 1, and this hand-lever 33 is preferably pivotally attached to the upper and lower longitudinal bars 30 and 31, the pivot-pins being designated, respectively, as 35 and 34, and said lever 33 is also provided with a thumb-latch 36, that engages with a rack 37, carried by one of the lower bars 31. Thus it will be observed that the plates may be independently raised and lowered, and likewise the toothed bars may be independently adjusted.

When the plates 21 are parallel with the ground and the teeth have been adjusted, the plates will insure the teeth entering the ground the desired distance only; but the plates may be raised so as to engage with the ground only at their rear or free edges, as shown in dotted lines in Fig. 1, so as to bear sharply upon the surface of the ground serving as a drag, the teeth at that time being above the surface of the ground.

In Fig. 5 I have shown a slight modification of the construction of my device, in which instead of the toothed bars 15 being mounted in sockets or bearings 13, carried by the straps 10, said bars are mounted in bearings 38, secured to and projecting above and beyond the rear edges of the plates 21, thus rendering the toothed bars free from the straps 10, yet compelling said bars to act in unison with the plates 21.

Having thus described my invention, I claim as new and desire to secure by Letters Patent—

1. In a harrow and pulverizer, a frame consisting of a series of forwardly and rearwardly extending bars, transverse plates, a hinge connection between a longitudinal surface of the plates and the frame-bars, all of said plates having corresponding edges free from the frame-bars, transverse toothed bars adjacent to the longitudinal edges of the plates, bearings for said toothed bars, a lifting device for the plates, and a shifting mechanism for the toothed bars.

2. In a harrow and pulverizer, a frame consisting of parallel straps provided with sockets at intervals in their length, toothed bars mounted to turn in said sockets, extending transversely of the frame, plates located between the toothed bars, said plates having their forward longitudinal edges hinged to the straps and their rear longitudinal edges free from the straps, a shifting lever connected with one of the toothed bars, and link connections with the other toothed bars, a lift-lever, and connections, substantially as described, between the lift-lever and the rear portion of all the plates, whereby all the plates may be simultaneously raised or lowered at the rear portions, as specified.

3. In a harrow and pulverizer, the combination, with a frame consisting of parallel straps having sockets at intervals in their length, angle-bars mounted to turn in the sockets of the straps, each bar being provided with elongated openings and with circular openings adjacent thereto, spring-clips having one member provided with a hook and the other adapted to receive a nut, the members of the clips provided with hooks being adapted to enter elongated openings in the toothed bars and the other members the adjacent circular openings in the toothed bars, teeth held within the clips in engagement with the said bars, and plates located between the toothed bars, the said plates having a hinged connection at their forward edges with the said straps, of a lever attached to one of the toothed bars, standards attached to the other toothed bars, and a connecting-rod pivotally connected with all of the standards and with the said lever, standards secured to the said plates, connecting-bars pivotally attached to the upper and lower portions of said standards, a lever pivotally attached to said connecting-bars, and locking devices for the said levers, for the purpose set forth.

HENRY G. MOSHER.

Witnesses:
CALVIN NELSON,
O. E. MILLER.